United States Patent [19]

Mizuguchi et al.

[11] Patent Number: 4,891,235

[45] Date of Patent: Jan. 2, 1990

[54] METHOD FOR EXPANSION TREATMENT OF FOODS

[75] Inventors: Takeshi Mizuguchi; Kiyoshi Shibuya, both of Higashiosaka, Japan

[73] Assignee: House Food Industrial Company Limited, Higashiosaka, Japan

[21] Appl. No.: 80,533

[22] PCT Filed: Dec. 26, 1986

[86] PCT No.: PCT/JP86/00656

§ 371 Date: Jul. 8, 1987

§ 102(e) Date: Jul. 8, 1987

[87] PCT Pub. No.: WO87/04054

PCT Pub. Date: Jul. 16, 1987

[30] Foreign Application Priority Data

Dec. 27, 1985 [JP] Japan .................................. 60-294830
Dec. 27, 1985 [JP] Japan .................................. 60-294831

[51] Int. Cl.$^4$ ...................... A23G 9/00; A23L 1/212; A23L 1/31; A23P 1/14

[52] U.S. Cl. .................................. 426/281; 426/447; 426/474; 426/564

[58] Field of Search ............... 426/281, 312, 445, 447, 426/474, 564

[56] References Cited

U.S. PATENT DOCUMENTS

| | | | |
|---|---|---|---|
| 1,855,670 | 4/1932 | Greenwood | 426/474 X |
| 2,278,463 | 4/1942 | Musher | 426/447 X |
| 2,653,097 | 9/1953 | Baer | 426/281 |
| 3,749,378 | 7/1973 | Rhodes | 426/474 X |
| 3,985,909 | 10/1976 | Kirkpatrick | 426/474 X |
| 4,001,457 | 1/1977 | Hegadorn | 426/474 X |
| 4,002,772 | 1/1977 | Haas | 426/281 |
| 4,055,675 | 10/1977 | Popper et al. | 426/447 X |
| 4,272,558 | 6/1981 | Bouette | 426/312 X |
| 4,289,794 | 9/1981 | Kleiner et al. | 426/474 X |
| 4,659,575 | 4/1987 | Fiedler | 426/474 X |

*Primary Examiner*—Arthur L. Corbin
*Attorney, Agent, or Firm*—Oblon, Spivak, McClelland, Maier & Neustadt

[57] ABSTRACT

The present invention relates to a method for forming voids within foods, including such solid foods as meat, fruit and vegetable, such liquid foods as water and syrup, and other foods in the form of sol or gel and a method for cooling and solidifying the aforementioned foods while maintaining many voids therein. The method for expansion treatment of these foods according to the present invention comprises forcing a water-soluble gas, such as carbon dioxide, into a moisture containing food under a pressure of not less than 15 kg/cm$^2$ in a pressure vessel and then reducing the pressure in the vessel at a rate of 1.5 to 150 kg/cm$^2$/min to cause expansion of the food. The method for expanding and solidifying foods according to the invention comprises increasing the pressure in the vessel during forcing the water-soluble gas into the food to liquefy the gas and then reducing the pressure in the vessel at a desired rate to cause expansion of the food and to evaporate the liquefied gas so as to cool and solidify the food. Accordingly, the method of this invention makes it possible to form voids within the tissues of a food, in particular within a solid food such as meat, and to uniformly form large voids in the foods by causing, for instance, separation of tissues from each other. As a result, the method of this invention makes these foods tender and can impart good drying properties to them.

8 Claims, 3 Drawing Sheets

METHOD FOR EXPANSION TREATMENT OF FOODS

FIELD OF THE INVENTION

The present invention relates to a method for causing expansion within solid foods such as meat, fruits and vegetables; liquids such as water, and syrup and other foods in the form of sol or gel and to a method for cooling and solidifying these foods while maintaining voids therein.

BACKGROUND OF THE INVENTION

Foods such as confectionery are generally crisp and good in taste if they include voids therein and, therefore, it has commonly been carried out to intentionally form voids in these foods. For instance, Japanese Un-examined Patent Publication No. 52-21368 discloses a method for preparing a dough for use in making baked confectionery which comprises kneading a dough maintained in a closed condition while injecting compressed gas therein and then releasing the pressure to ordinary pressure to obtain a dough having a lot of voids uniformly distributed therein. More specifically, in the Un-examined Publication it is disclosed that the dough is subjected to gas injection at a pressure of about 4 kg/cm$^2$ and that the release of the pressure is effected about 2 minutes after the gas injection. Furthermore, Japanese Patent Publication No. 57-49182 discloses a method for producing foods of fine and porous texture which comprises freezing a solid moisture-containing food of viscous or dense texture while pressing the foods at a gauge pressure of 20 to 70 kg/cm$^2$ using a highly compressed gas, then thawing and dehydrating the food. In addition, Japanese Patent Publication No. 58-26942 discloses a method for producing granular confectionery containing voids therein which comprises transferring liquid confectionery in a container for solidifying and grinding the liquid confectionery after forming voids therein, separating the container for solidifying and grinding which contains the liquid confectionery having voids therein from a container for forming voids in the liquid confectionery and transferring the container for solidifying and grinding to a freezing apparatus to force-cool the same, so as to enhance the freezing efficiency. However, in the foregoing methods, it is not possible to sufficiently expand foods and, in particular, properties of solid foods such as meat and vegetable are not improved even when such a method is applied to these foods.

Moreover, if voids are formed within these foods and then the foods are solidified by freezing the same according to any one of the foregoing methods, the freezing treatment is carried using equipment different from that for the pressing treatment (void-forming treatment). Therefore, these methods include the use of complicated apparatuses and procedures. It therefore takes a long period of time to cool and solidify the expanded foods.

SUMMARY OF THE INVENTION

It is a purpose of this invention to provide a method for expansion treatment of foods which permits the formation of large voids in a solid foods such as in particular meat by sufficiently forming voids in the tissues thereof to consequently cause, for instance, separation of tissues from each other, which in turn leads to the formation of soft foods and makes it possible to impart excellent drying properties to the resultant foods.

It is another purpose of the present invention to provide a method for expanding and solidifying foods which makes it possible to cool and solidify the expanded foods within a very short period of time.

The present invention has been accomplished on the basis of the finding that the aforementioned problems can be eliminated by, upon carrying out the formation of voids, dissolving a water-soluble gas in moisture contained in foods under a specific pressure and then reducing the pressure at a desired rate of pressure drop. In addition, the present invention is also based on the finding that an expanded and solidified food can easily be produced by further increasing the pressure to cause the liquefaction of the gas introduced and to maintain the liquefied gas around the foods when dissolving the water-soluble gas into the moisture contained in the foods and by utilizing the effect of gasification and endothermic effect associated with the gasification during the pressure release procedure.

Accordingly, the present invention relates to a method for expansion treatment of foods which is characterized by forcing a water-soluble gas into a moisture-containing food under a pressure of not less than 15 kg/cm$^2$ in a pressure vessel and thereafter reducing the pressure at a rate of 1.5 to 15 kg/cm$^2$/min to cause the expansion of the food.

BRIEF EXPLANATION OF THE ACCOMPANYING DRAWINGS

FIG. 1 is a micrograph of beef treated according to the method of this invention; FIG. 2 is a micrograph of raw beef; FIG. 3 is a sectional view of a pressure vessel which can suitably be used in the method of this invention; FIG. 4 is an electron micrograph showing a sectional view of rice which is treated according to the method of this invention and then is dried; and FIG. 5 is a micrograph showing a sectional view of the rice which is treated according to a conventional method and then is dried.

DESCRIPTION OF THE PREFERRED EMBODIMENT

Figure 1:
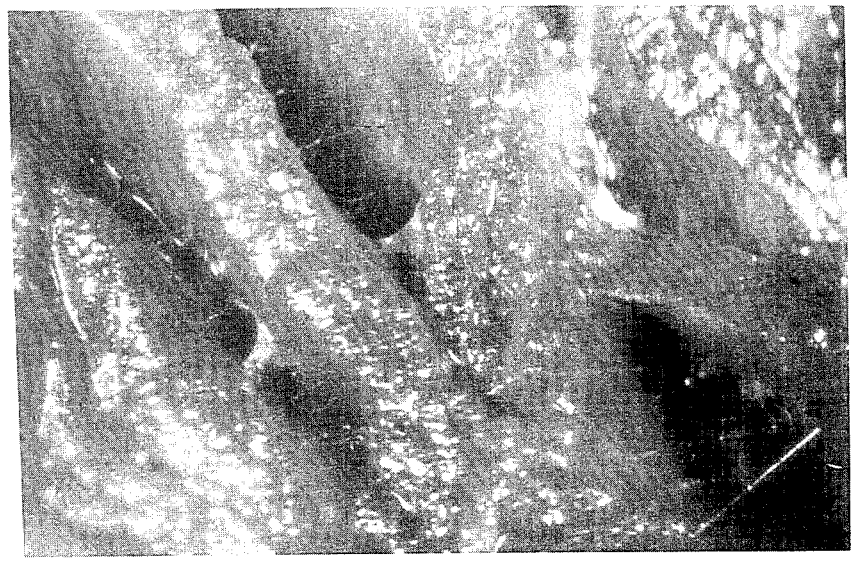

The method for expansion treatment of foods according to the present invention can be applied to moisture-containing foods, for instance, those having a moisture content of not less than 20% by weight (hereunder simply referred to as "%"), preferably from 60% to 100%. This is because, the greater the moisture content, the higher the amount of the water-soluble gas dissolved in the foods and the greater the degree of expansion and thus the effects of the present invention become more and more noticeable. Accordingly, it is also possible to pretreat foods by, for instance, immersing them in water so as to condition the moisture content thereof up to a desired value according to the present invention. Examples of foods to which the method of the present invention can be applied include raw foods such as meat, fruits, vegetable; heat treated foods such as cooked rice, steamed sweet potatoes, boiled beans; and other foods such as sherbets, ices. Among these, the method of the present invention is particularly suitable for application to meat and thus relatively tough meat can be made tender, while the taste and texture thereof can be improved. Examples of meats which can be treated according to the method of the present invention are such as foreshank, hind shank, leg, round or ham of beef or pork. Moreover, the foods to be treated according to the method of this invention may be in any form or shape. In this respect, it is desirable that the size thereof be not more than 50 mm square in order to assure that the water-soluble gas will be dissolved in the foods within a very short time. On the other hand, if an expanded and solidified food is to be produced, it is also preferred to use water and a liquid for preparing sherbet. In this case, frozen deserts such as foamed ices and sherbet-like deserts of excellent taste and texture can easily be obtained.

According to the present invention, the foregoing moisture containing foods are introduced into a closed pressure vessel. In other words, they are maintained under a closed environment and then a water-soluble gas is charged into the pressure vessel at a desired pressure to press the water-soluble gas into the foods. In this connection, any known pressure vessels may be used in this invention. However, the use of the pressure vessel shown in FIG. 3 makes it possible to more effectively carry out the injection of the gas into the vessel and to control the pressure therein. In other words, the foods to be treated are first introduced into a pressure vessel 1 provided with a cover 2 and then a watersoluble gas is injected therein. The pressure within the pressure vessel is detected and controlled by a pressure sensor 4 and it is in general controlled to a value not less than 15 kg/cm$^2$ while the temperature in the pressure vessel is detected and controlled by a temperature sensor 5. After the lapse of a desired time, the foods are expanded by releasing the gas from the vessel through an on-off valve 3 disposed on the cover of the vessel and/or on the side portion thereof, while adjusting the rate of the pressure drop by use of a pressure sensor.

On the other hand, if it is intended to produce an expanded and solidified food, it is in general required to cool and solidify the same. This is preferably carried out by liquefying the foregoing water-soluble gas and then evaporating the gas. In this case, the cooling effect associated with the gas evaporation can effectively give rise to the cooling and solidification of the foods. In this connection, it is necessary to inject the gas at a pressure higher than the vapor pressure at ambient temperature during the gas injection in order to liquefy the gas. For example, it is preferred to control the amount of the gas injected so that the ratio of foods to be treated to the amount of the gas injected is not more than 1:2 (expressed as weight ratio), more preferably not more than 1:4.

As the temperature of the foods to be treated and that of the foods contained in a treating chamber reach 0° C., the amount of the gas which must be injected so as to attain the same effect as that mentioned above becomes smaller and smaller. Moreover, a uniform and porous solidified food can be obtained within a shorter time by decreasing the above ratio to at 1:7 or more.

In the foregoing operation, the water-soluble gases usable herein include, for instance, air, nitrogen, carbon dioxide, N$_2$O and Freon. Among these, carbon dioxide gas is preferred because it has a high solubility in water and it exerts no detrimental influence on the foods to be treated. The conditions of pressure application and reduction are as follows:

Conditions of the Pressure Application

The pressure to be applied during the foregoing operation should be not less than 15 kg/cm$^2$, and preferably 20 to 70 kg/cm$^2$. In this case, the pressure should be increased at a rate of 0.5 to 5 kg/cm$^2$/min. On the other hand, when treating foods such as fruits, for instance banana, which have weak tissues and are easily broken, it is desirable to treat them under a relatively low pressure, for instance, 15 to 40 kg/cm$^2$. In addition, when the foods to be treated are hard, are large in size and thickness and have a low moisture content, it is desirable to apply a rather high pressure to the foods in order to cause dissolution of more gas in the foods.

The compressed condition should be maintained for a time sufficient to dissolve a sufficient amount of the gas in water present within the foods, which allows the foods to undergo a sufficient expansion during pressure reduction, and it is, for instance, preferred to maintain the condition for 10 to 60 minutes. Moreover, the temperature of the foods to be treated during pressing is not restricted to a specific value. However, a rather low temperature is preferred since the amount of gas dissolved increases and the degree of the expansion becomes also high. Therefore, the temperature should fall within the range of 0° to 25° C., preferably from 5 to 25° C. However, when it is intended to expand foods such as fruits or foods which, because they are hard at low temperature, undergo little expansion, it is preferable to expand them at a rather high temperature, at which the tissues thereof are maintained in a soft condition, in order to improve the degree of the expansion. On the contrary, when it is intended to produce expanded and solidified foods, the application of the pressure should be initiated at a temperature of 0° to 10° C.

Conditions for Pressure Reduction

It is necessary to reduce the pressure within the system at a pressure reduction rate of 1.5 to 150 kg/cm$^2$/min, preferably 20 to 60 kg/cm$^2$/min. This is because, the tissues of the foods to be treated can be broken down to an appropriate degree by reducing the pressure at such a rate of pressure drop. Furthermore, it is preferred to reduce the pressure at a rate of 1.5 to 50 kg/cm$^2$/min in the case where the foods to be treated are fruits such as banana and strawberry, 50 to 150 kg/cm$^2$/min in the case of meat, 20 to 70 kg/cm$^2$/min in the case of cooked rice, and 70 to 150 kg/cm$^2$/min in the case of the steamed sweet potatoes, chestnuts and soy bean. In this connection, if the rate of the pressure reduction is expressed as the time required to reduce the pressure, such procedure is carried out for not more than 110 minutes, and more preferably 30 sec. to 20 minutes.

On the contrary, in order to expand and solidify foods by gasifying the liquefied gas surrounding the foods so as to cool the same, it is desirable to reduce the pressure of the system at a rate of 2 to 60 kg/cm$^2$/min, preferably 4 to 50 kg/cm$^2$/min. This is because, if the rate of pressure drop is less than 2 kg/cm$^2$/min, the gasification also robs heat from materials other than the treated foods such as the vessel for containing the foods therein and as a result it takes a long period of time to cool and solidify the materials to be treated. Moreover, the size of the voids formed becomes large to some extent since it takes a long period of time to freeze and solidify the foods. On the other hand, if the rate of the pressure drop is more than 60 kg/cm$^2$/min, there is a tendency for the size of the voids formed to become rather small, though a good cooling effect is achieved.

The reduction of the pressure is in general carried out until the final pressure reaches ordinary pressure. However, it is also possible to once reduce the pressure to less than ordinary pressure and then increase it to ordinary pressure. Furthermore, if drying under reduced pressure is subsequently carried out, the final pressure may be lower than ordinary pressure.

The basic process of the method of the present invention are those described above. However, when it is not necessary to solidify the foods to be treated, the aforementioned process for pressing the gas into the food may be carried out with the food immersed in water or a desired aqueous solution. This makes it possible to achieve the following effects: (i) the amount of the gas dissolved in the foods is increased and the degree of the expansion is also improved owing to the increase in the moisture content of the foods; (ii) the reduction of the temperature of the foods during release of the pressure can be reliably prevented and in turn hardening of the tissues owing to the temperature decrease can also be prevented; and (iii) the distribution of the moisture in the foods becomes uniform and as a result uniform voids can be obtained.

On the other hand, if the method of the present invention is applied to so-called boiled meat, it is desirable to apply such boiling treatment after the treatment according to the present invention is completed since the amount of the moisture content of the foods is reduced by such a boiling treatment and thus only a small amount of the gas is dissolved in the meat.

Meanwhile, according to the method of this invention for expanding and solidifying foods, the resultant products per se may be used as frozen deserts, ices and frozen foods. Moreover, the foods obtained according to the foregoing treatment may be freeze-dried. In this case, the drying efficiency is high compared to that attained when foods are frozen according to a conventional method and are then dried under reduced pressure, since the foods treated according to the present invention are frozen while maintaining voids therein. In addition, the products obtained after drying procedure are porous and provide a good rehydration property when they are cooked according to, for instance, the hot-water rehydration technique, also the resulting rehydrated product is tender and has excellent properties.

According to the method for expansion treatment of this invention, voids are formed within the treated foods due to the separation of the tissues from each other and the destruction of the tissues and, therefore, the area which comes into contact with a drying medium is enlarged. In addition, passages for escaping gases or the like are also formed within the treated foods and, therefore, the drying operation can easily be carried out at a very high efficiency since such passages serve as a path through which the gases included in the foods can escape when the foods are subjected to drying operation. In order to dry the foods, methods for drying under reduced pressure such as frying under reduced pressure are particularly preferred because of their high efficiency.

The method for expansion treatment of foods according to the present invention can preferably be applied to, in particular, solid materials such as a variety of meats, fruits, vegetables and grains and the method makes it possible to tenderize the foods and to improve their taste, texture and chewability thereof.

Moreover, foods can be made porous according to the method of the present invention and, therefore, the treating efficiency upon cooking the foods in different manners or seasoning them by immersing the same in a liquid or upon sterilizing the same is highly improved.

In addition to the foregoing effects, it is also possible to enhance the thawing efficiency when the foods are further freeze-dried after subjecting them to the treatment of the present invention.

Furthermore, the method according to the present invention may also be applied to foods in the form of gel, sol or the like.

On the contrary, according to the method for expanding and solidifying foods in which the expansion and the cooling-solidification treatments are simultaneously carried out, cooled and solidified foods having a lot of large and uniform voids therein can be prepared within a short period of time and at a high efficiency. Thus, the method according to the present invention can be adopted to treat a variety of foods and the following effects may be attained depending on the kind of foods:

Foamed Water

When water is treated according to the method of this invention, ices having novel texture, taste and appearance are obtained and the resulting ices are very crisp. Moreover, ices can be prepared within a shorter time compared with the conventional freezing method.

Sherbet-like Ices

Such ices can easily be produced utilizing a variety of syrups or the like.

Frozen Foods

The texture of these foods is very porous and the efficiency of thawing is excellent when they are thawed in an microwave oven or the like.

Frozen Meat

Since the frozen meat prepared according to the method of this invention has voids therein, the heat transfer therethrough is good and the thawing efficiency thereof is good while the penetration of the seasonings is also good, and thus the meat can be cooked within a very short period of time. Moreover, since the fibrous materials of even tough meat are separated from each other due to expansion, it can be tenderized and the taste and texture thereof can be improved.

Frozen Fruits

Since the frozen fruits treated according to the method of the present invention include voids therein, frozen deserts which are crisp and delectable can be obtained. In addition, the fibrous materials thereof are also separated from each other due to the expansion treatment and thus the flesh thereof is tenderized.

Jelly-like Foods

According to the method of the present invention, these jelly-like foods may include voids therein in dipersed state and thus confectionery having a unique texture and taste can be obtained.

As seen from the foregoing description, the method according to the present invention may widely be applied to a variety of foods since the method provides a lot of advantages.

The present invention will hereunder be explained with reference to specific examples. However, it should be appreciated that the present invention is not limited to these specific examples.

EXAMPLE 1

Figure 3:
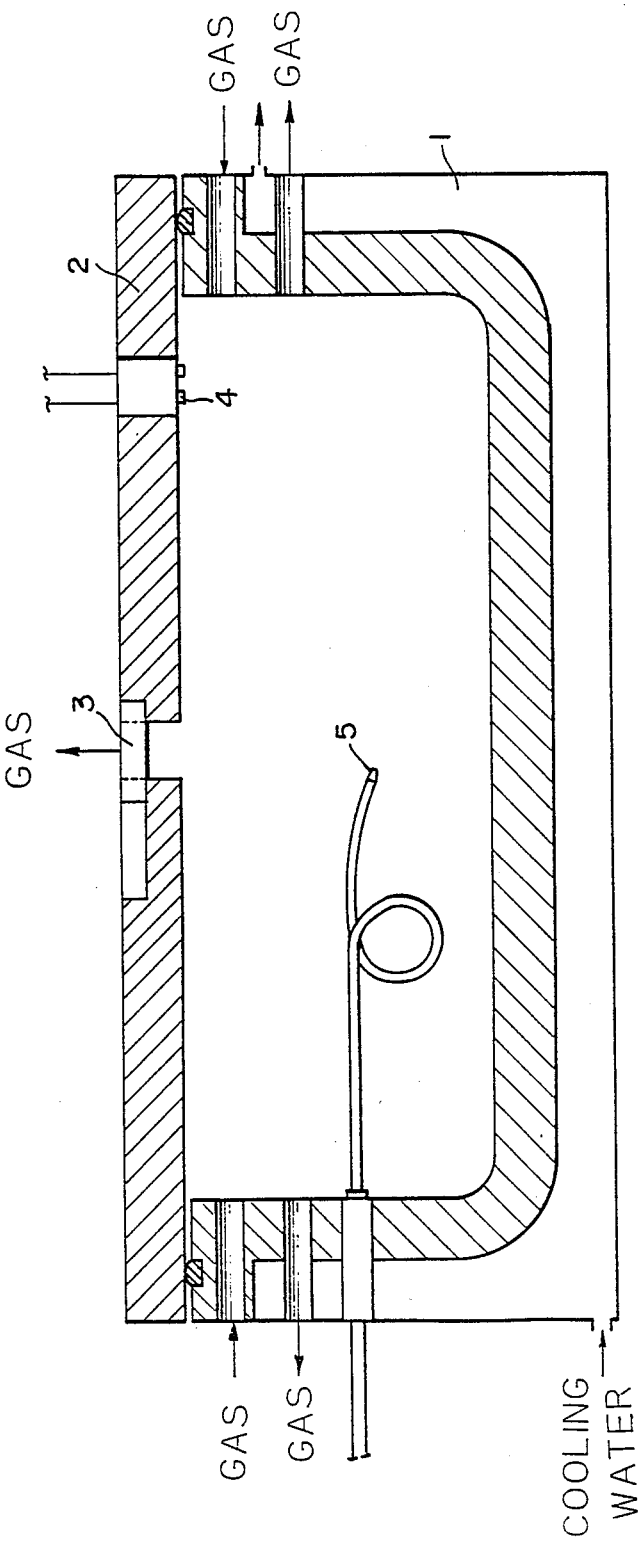

After charging 40 g of beef (round) measuring $20 \times 20 \times 10$ mm into a treating vessel as shown in FIG. 3, $CO_2$ gas was forced into the vessel to establish a pressure of 50 kg/cm$^2$ therein. Thereafter, the pressurized condition was maintained for 30 minutes and then the pressure of the treating vessel was released at the rate of 25 kg/cm$^2$/min until the pressure reached ordinary pressure, to complete the treatment of the beef. At this stage, the temperature was maintained at 20° C.

COMPARATIVE EXAMPLE 1

The same kind of raw beef as used in EXAMPLE 1 was itself used as a control sample.

COMPARATIVE EXAMPLE 2

Beef was treated according to the same procedures as those disclosed in EXAMPLE 1 except that the pressure of the treating vessel was set at 10 kg/cm$^2$ and the rate of pressure drop was adjusted to 10 kg/cm$^2$/min.

COMPARATIVE EXAMPLE 3

Beef was treated according to the same procedures as disclosed in EXAMPLE 1 except that the pressure of the treating vessel was set at 50 kg/cm$^2$ and the rate of pressure drop was adjusted to 0.28 kg/cm$^2$/min.

The following tests were carried out on the beef samples obtained in the foregoing EXAMPLE 1 and COMPARATIVE EXAMPLES 1 to 3.

Heating Efficiency—The time elapsed till the redness of the central portion of the meat disappeared by boiling treatment was determined.

Physical Properties—The heat treatment was ceased immediately after the redness of the central portion of the meat disappeared and thereafter the tenderness of the meat thus obtained was determined by having a tester eat the same.

Permeability of Seasonings—The meat was boiled in a beef bouillon soup for 2 minutes, and then the extent of the penetration of seasonings in the meat determined according to sensory evaluation. The results thus obtained are listed in Table I.

TABLE I

| Sample | Heating Efficiency (min) | Physical Property | Penetration of Seasoning |
| --- | --- | --- | --- |
| Ex. 1 | 3 | very tender | penetration even to the central part thereof |
| Comp. Ex. 1 | 5 | tough and difficult to bite off | penetration incomplete |
| Comp. Ex. 2 | 4 | somewhat hard | penetrating only to the peripheral part thereof |
| Comp. Ex. 3 | 4 | somewhat hard | penetrating only to the peripheral part thereof |

Figure 2:
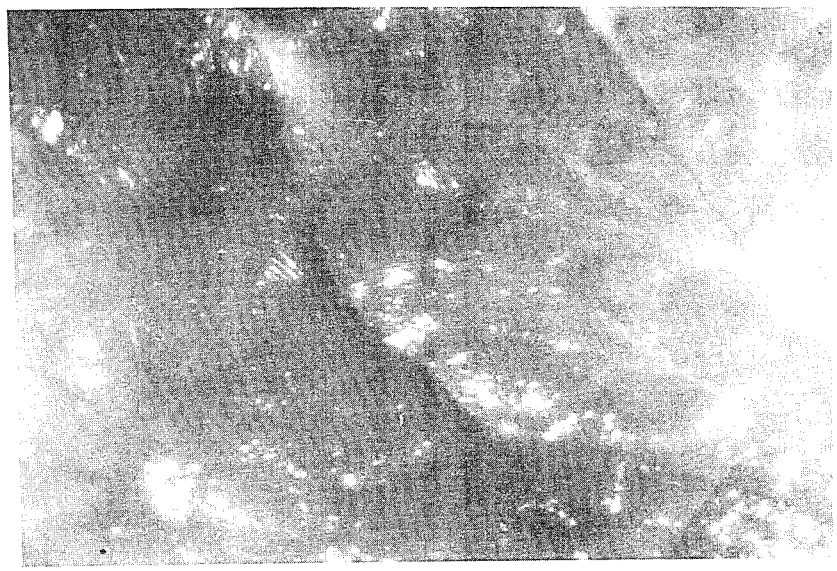

As seen from the results listed in Table I, according to the present invention, beef of a very high heating efficiency was obtained and the beef was also excellent in physical properties and the permeability to the seasonings. Moreover, it was also found that the meat treated according to the present invention (EXAMPLE 1) underwent sufficient separation of the tissues of the meat from each other and voids were sufficiently formed therebetween, in comparison with the results obtained according to COMPARATIVE EXAMPLE 1. Micrographs (40X magnification) of the treated meats are shown in FIGS. 1 and 2 respectively.

EXAMPLE 2

After immersing a quantity of milled nonglutinous rice in 1.5 times as much water for 20 to 30 minutes, the rice was cooked according to a conventional manner and then was allowed to steam by its own heat for 30 minutes to obtain a cooked rice. An amount (30 g) of the cooked rice (at a temperature of 15° C.) was treated under the same conditions as in EXAMPLE 1.

COMPARATIVE EXAMPLE 4

The cooked rice per se as obtained in EXAMPLE 2 was used as a control sample.

COMPARATIVE EXAMPLE 5

The cooked rice obtained in EXAMPLE 2 was treated under the same conditions as in COMPARATIVE EXAMPLE 2.

COMPARATIVE EXAMPLE 6

The cooked rice produced in EXAMPLE 2 was treated according to the same procedures as in COMPARATIVE EXAMPLE 3.

Each of the cooked rices treated according to the foregoing methods was subjected to puffing treatment in which the pressure was rapidly reduced. In other words, after the cooked rice was charged into a vessel for treating it under reduced pressure, the pressure in the vessel was immediately reduced to 0.3 Torr and this condition was maintained for 16 hours to obtain dried cooked rice. In this connection, the temperature within the treating vessel was maintained at 30° C. during the puffing treatment under the rapid pressure reduction condition.

The drying characteristics (drying rate) during the foregoing drying process were determined and the rehydration property (expressed as the time required to increase the moisture content of the dried cooked rice up to 60% when immersed in water) and the taste and texture as determined by sensory evaluation were also inspected. The results observed are summarized in Table II.

TABLE II

| Sample | Drying Rate | Rehydration Property | Taste and Texture |
| --- | --- | --- | --- |
| Ex. 2 | rapid as a whole | 2.5 min | no halfdone part; wholly soft |
| Comp. Ex. 4 | slow as a whole | 4 min | substantially halfdone |
| Comp. Ex. 5 | initially rapid, thereafter slow | 3.5 min | substantially halfdone |
| Comp. Ex. 6 | initially rapid and gradually slower | 3 min | halfdone but wholly soft |

As seen from the results listed in Table II, it was found that the method of the present invention provides an excellent dried cooked rice.

EXAMPLE 3

Water (40 g) was introduced in a pressure vessel and CO$_2$ gas (280 g) was injected therein at a pressure of 35 kg/cm$^2$ to dissolve the gas in the water and to form liquid CO$_2$ on the surface of the water. This condition was maintained for 30 minutes followed by reducing the pressure at the rate of 4.1 kg/cm$^2$/min to form a foamed ice. The temperature of the water was maintained at about 0° C. The ice thus produced had the properties listed in the following Table for the purpose of comparing them with those of ice produced according to a conventional method:

| | Texture | Texture | Volume |
| --- | --- | --- | --- |
| Foamed ice | opaque and porous | soft | 1.5 times that of the original water |
| Conventional ice | transparent and uniform | hard | approximately the same volume as that of the |

-continued

| | Texture | Texture | Volume |
|---|---|---|---|
| | | | water |

EXAMPLE 4

A frozen cuttlefish was boiled in water for 2 minutes and then sliced into pieces 5 mm in thickness. The resulting pieces (30 g) were charged into a pressure vessel and then $CO_2$ gas (280 g) was injected into the vessel at a pressure of 56 kg/cm$^2$ to dissolve the $CO_2$ gas into the cuttlefish as well as to obtain liquid $CO_2$ thereon. This condition was maintained for 30 minutes and thereafter the pressure of the pressure vessel was reduced to ordinary pressure at a rate of pressure drop of 50 kg/cm$^2$/min. In this connection, the temperature of the cuttlefish used was 20° C.

The frozen cuttlefish thus obtained was dried at a temperature of 35° C. and a pressure of 0.1 to 0.2 Torr for 16 hours to form a dried cuttlefish.

COMPARATIVE EXAMPLE 7

Sliced pieces of cuttlefish (30 g) the same as used in EXAMPLE 4 were frozen at a temperature of −40° C. and then was dried under reduced pressure as in EXAMPLE 4.

The rehydration properties and taste were examined for the dried cuttlefish obtained in the foregoing EXAMPLE 4 and COMPARATIVE EXAMPLE 7. The results thus obtained are listed in Table III. In this respect, the rehydration property of the cuttlefish was determined by examining the degree of rehydration at the center of the cuttlefish when the dried cuttlefish was immersed in hot water for 30 minutes, while the taste was determined by sensory evaluation for a product cooked according to a conventional method.

TABLE III

| Sample | Drying Efficiency | Rehydration Property | Texture |
|---|---|---|---|
| Ex. 4 | drying rate rapid initially | very tender even at the central part | halfdone in parts but generally tender |
| Comp. Ex. 7 | slow on the whole | rehydration at the central part incomplete | generally tough |

EXAMPLE 5

Cooked rice (30 g) which was cooked in a conventional manner was treated according to the same procedures as those in EXAMPLE 4 to form dried rice.

COMPARATIVE EXAMPLE 8

The same cooked rice as used in EXAMPLE 5 was treated according to procedures similar to those in COMPARATIVE EXAMPLE 7 to form dried rice.

With respect to the dried rice obtained in EXAMPLE 5 and COMPARATIVE EXAMPLE 8, properties such as rehydration property and taste were examined and the results observed were listed in Table IV. In these examinations, the rehydration property was determined by examining the time required to increase the moisture content of the dried rice up to 60% and the taste was determined according to sensory evaluation of samples which had been rehydrated according to the hot water pouring technique.

TABLE IV

| Sample | Drying Efficiency | Rehydration Property | Texture |
|---|---|---|---|
| Ex. 5 | initial drying rate rapid | 3 min | totally tender |
| Comp. Ex. 8 | slow as a whole | 4 min | halfdone in parts in some extent and tough throughout |

Figure 4:
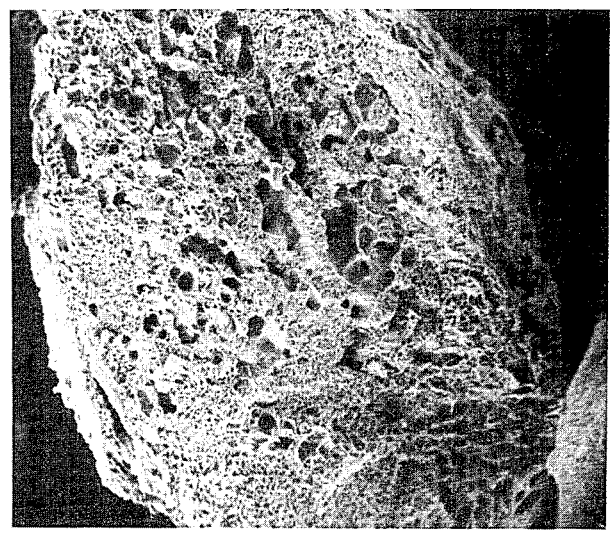
Figure 5:
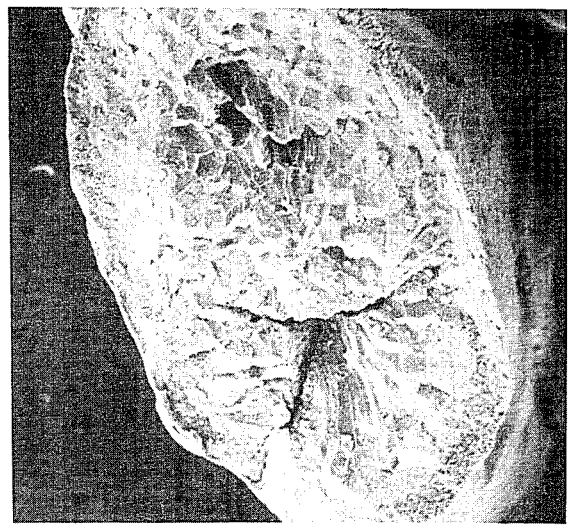

Electron micrographs (30X magnification) of the dried rice obtained in EXAMPLE 5 and COMPARATIVE EXAMPLE 8 are shown in FIGS. 4 and 5 respectively. From the results shown in these figures and listed in the foregoing Tables, it is clear that the method according to the present invention is quite advantageous over the conventional methods.

We claim:

1. A method for expanding and solidifying foods which consists essentially of forcing carbon dioxide gas into a moisture containing food under a pressure of not less than 15 kg/cm$^2$ in a pressure vessel, wherein the temperature of the food during said forcing step ranges from 5° to 25° C., increasing the pressure in the vessel to liquefy the carbon dioxide gas, maintaining the liquefied gas around the food and then reducing the pressure in the vessel at a rate of pressure drop of 1.5 to 150 kg/cm$^2$/min to cause expansion of the food and to evaporate the liquefied gas so as to cool and solidify the food by utilizing the endothermic effect associated with the said pressure reducing step.

2. The method as set forth in claim 1 in which the food is in a solid state.

3. The method as set forth in claim 1 in which the food is a member selected from the group consisting of meat, fruit, vegetable, cooked rice, steamed sweet potato and steamed beans.

4. The method as set forth in claim 1 in which the food is water or a liquid for preparing sherbet.

5. The method as set forth in claim 1 in which the pressure applied to the food ranges from 20 to 70 kg/cm$^2$.

6. The method as set forth in claim 1 in which the rate of application of pressure is in the range of 0.5 to 5 kg/cm$^2$/min.

7. The method as set forth in claim 1 in which the rate of pressure drop is in the range of 2 to 60 kg/cm$^2$/min.

8. The method as set forth in claim 1 in which the rate of pressure drop ranges from 4 to 50 kg/cm$^2$/min.

* * * * *